(12) United States Patent
Lundell et al.

(10) Patent No.: US 12,706,967 B2
(45) Date of Patent: Aug. 11, 2026

(54) VIDEO ENCODING DYNAMIC REFERENCE FRAME SELECTION

(71) Applicant: Microsoft Technology Licensing, LLC, Redmond, WA (US)

(72) Inventors: Benjamin Eliot Lundell, Seattle, WA (US); Ivan Simoes Gaspar, West Linn, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 523 days.

(21) Appl. No.: 18/114,556

(22) Filed: Feb. 27, 2023

(65) Prior Publication Data

US 2024/0291882 A1 Aug. 29, 2024

(51) Int. Cl.
*H04L 65/752* (2022.01)
*H04L 65/80* (2022.01)

(52) U.S. Cl.
CPC ............ *H04L 65/752* (2022.05); *H04L 65/80* (2013.01)

(58) Field of Classification Search
CPC ..... H04L 65/752; H04L 65/80; H04N 19/105; H04N 19/164; H04N 19/172
See application file for complete search history.

(56) References Cited

U.S. PATENT DOCUMENTS

2006/0078051 A1 4/2006 Liang et al.
2006/0146830 A1 7/2006 Lin et al.
2016/0007045 A1* 1/2016 Perlman ................ H04L 65/752 375/240.27
2021/0160480 A1 5/2021 Zhao et al.

FOREIGN PATENT DOCUMENTS

| | | |
|---|---|---|
| EP | 0763944 | 3/1997 |
| EP | 0902593 | 3/1999 |
| EP | 1961232 | 8/2008 |
| WO | WO 2009/074641 | 6/2009 |

OTHER PUBLICATIONS

Farber et al., "Robust H.263 Compatible Video Transmission for Mobile Access to Video Servers," Proc. Int. Conf. Image Processing, 4 pp. (1997).
International Search Report and Written Opinion dated May 27, 2024, from International Patent Application No. PCT/US2024/016422, 15 pp.
ITU-T, "ITU-T Recommendation H.263 Video Coding for Low Bit Rate Communication," 162 pp. (Feb. 1998).
Karczewicz et al., "A Proposal for SP-frames," VCEG-L27, 9 pp. (Jan. 2001).

(Continued)

*Primary Examiner* — James M Pontius
(74) *Attorney, Agent, or Firm* — Klarquist Sparkman, LLP

(57) ABSTRACT

A computer implemented method includes obtaining video frames to transmit. The video frames are encoded and transmitted via a network connection. A probability that a last video frame will be or was received is determined. A next frame is encoded and transmitted as a P-frame that identifies changes from a previously transmitted frame. The previously transmitted frame is selected as a function of the probability that the last transmitted video frame was received.

20 Claims, 5 Drawing Sheets

(56) References Cited

OTHER PUBLICATIONS

Karczewicz et al., "The SP- and SI-Frames Design for H.264/AVC," IEEE Trans. on Circuits and Systems for Video Technology, vol. 13, No. 7, pp. 637-644 (2003).
Microsoft Corporation, "RTP Payload Format for RT Video Streams Extensions," 36 pp. (2012).
Microsoft Corporation, "RTP Payload Format for RT Video Streams Extensions," 36 pp. (2021).
Rhee et al., "Error Recovery using FEC and Retransmission for Interactive Video Transmission," Technical Report, 23 pp. (Jul. 1998).
Rhee et al., "FEC-based Loss Recovery for Interactive Transmission—Experimental Study," 23 pp. (Nov. 1998).
Sullivan, "Draft for 'H.263++' Annexes U, V, and W to Recommendation H.263," ITU-T, Study Group 16, Question 15, 46 pp. (Nov. 2000).
Wilkins, "Real-time Video with VP8/WebM," 14 pp. (2011).
Zhang et al., "Robust Video Coding for Packet Networks with Feedback," Proceedings of the Conference on Data Compression 2000, Mar. 28-30, 2000, 10 pages.
Communication pursuant to Rules 161(1) and 162 EPC dated Oct. 8, 2025, from European Patent Application No. 24713274.9, 3 pp.

* cited by examiner

VIDEO ENCODING DYNAMIC REFERENCE FRAME SELECTION

BACKGROUND

Modern video encoding works by sending a sequence of I and P frames. The I-frame is also known as an intra-coded picture and is essentially a complete image and thus minimally compressible. The P-frame is a predicted picture which encodes changes from a previous frame, referred to as a reference frame. The reference frame may be either an I-frame or a P-frame. To minimize the amount of data transferred over a network connection, it is more efficient to send more P-frames and as few I-frames as possible.

When the network connection quality can change rapidly, such as while moving in a cellular network, frames may not be successfully transmitted or received. If the connection is poor, and a P-frame is dropped, then the encoder must send an I-frame to reset the video stream. Since I-frames are much larger that P-frames, even more bandwidth may be consumed, resulting in even more dropped frames.

Generally, to overcome this problem, applications employ a buffering technique. Specifically, an application may send 10 seconds of video frames to the device before starting playback of the video. Then, during times of poor connectivity, the application can resend any P-frames that do not make it to the device. While this takes additional time, it is not visible to the end user because of the initial buffering phase. However, buffering is not possible where real time video is desired.

SUMMARY

A computer implemented method includes obtaining video frames to transmit. The video frames are encoded and transmitted via a network connection. A probability that a last video frame was received is determined. A next frame is encoded and transmitted as a P-frame that identifies changes from a previously transmitted frame. The previously transmitted frame is selected as a function of the probability that the last transmitted video frame was received.

DETAILED DESCRIPTION

Figure 1:
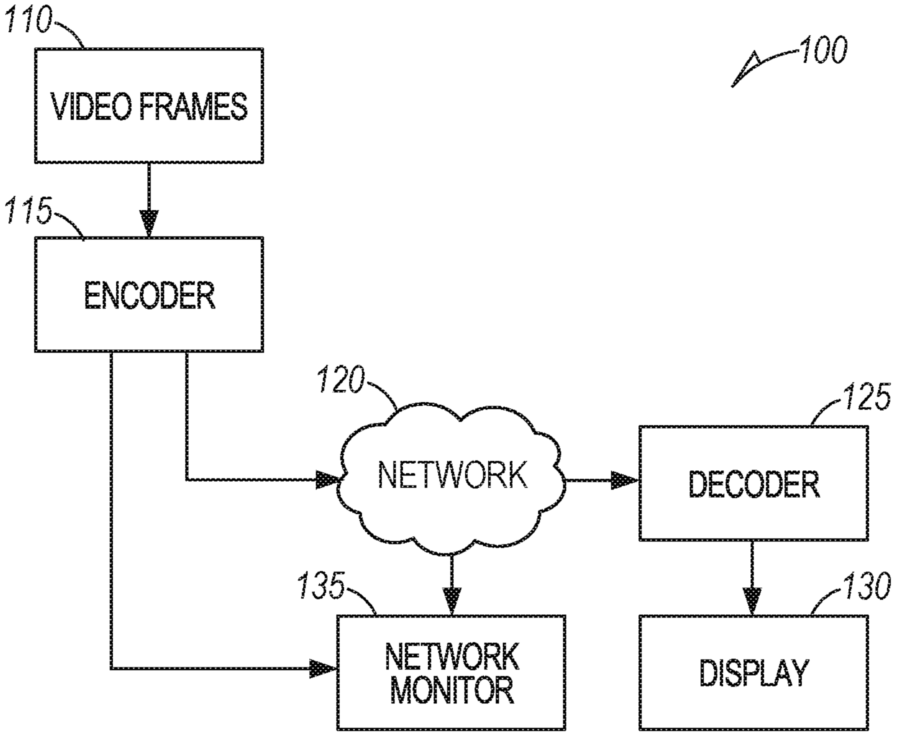
FIG. 1 is a block diagram illustrating a system for encoding and transmitting video frames with minimal latency despite changing network connection conditions according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Rendering and transmission of video in real time is done using video encoding to reduce transmission bandwidth requirements. Modern video encoding works by sending a sequence of I-frames and P-frames. The I-frame is also known as an intra-coded picture and is essentially a complete image and thus minimally compressible. The P-frame is a predicted image which encodes changes from a previous frame, referred to as a reference frame. The reference frame may be either an I-frame or a P-frame. To minimize the amount of data transferred over a network connection, it is more efficient to send more P-frames and as few I-frames as possible.

While initial buffering and resending of P-frames works well for stored video content that is being watched, such a buffering technique will not work for real time video, such as that used in mixed reality devices. Real time video may include graphics and other temporal visual information, which may be two-dimensional representations or three-dimensional representations suitable for mixed reality devices.

Video content may be rendered in cloud-based resources and transmitted to mixed reality device such as a user headset. It is important that such video be played on the user headset in real time to synchronize with real world events being viewed.

Many mixed reality devices are mobile in nature and utilize wireless communication networks. Network bandwidth conditions may change as a user of the mixed reality device moves. If the network bandwidth conditions result in bandwidth insufficient to ensure successful transmission of a frame, the next received frame may be based on changes from the frame that was likely not received. This can result in very poor video quality for the user.

An improved video encoder obtains network connection quality information while transmitting encoded video frames. The network connection quality information is used to dynamically select a reference frame for encoding a next P-frame. Such dynamic selection allows the video encoder to transmit P-frames from a last known received reference frame, instead of a previously transmitted frame that was most likely not received.

The improved encoder may be used in any device or network connected computing resources for transmission and reception of video for playing or processing in near real time. Near real time means that delays between transmission and processing or playing of video should not degrade a user experience. Typical tolerable delays, or latency, are less than one second in some examples, while other examples may tolerate delays of 100 msecs or less, and typically delays or latency within 40-60 msec.

FIG. 1 is a block diagram illustrating a system 100 for encoding and transmitting video frames with minimal latency despite changing network connection conditions. Video frames 110 are provided to a video encoder 115. The video encoder 115 will start by encoding an I-frame and then encode P-frames based on changes from preceding frames. The frames will be transmitted via a network 120 to a decoder 125 for display on a display 130 in one example. The encoder 115 and decoder 125 are on different systems. Both such systems may include encoders and decoders in one example for transferring video frames in both directions.

A network monitor 135 is coupled to provide indications of network quality in one example. The indications may be an estimate of future network quality in one example, or current network quality. In the case of cellular connections, a signal strength may be used as the indication of network quality. In further examples, the probability that a frame will have been received may be based on receipt of an acknowledgement of frame receipt from a system that includes the decoder 125. If no acknowledgement of receipt is received within 5 msec in one example, it is assumed that the frame was not received, and encoding of the next P-frame is performed based on a previously sent frame. In further examples, the probability of frames having been received may be based on one or more factors, including the above factors and even receiving signaling of congestion from a network management system, packet error rates, or buffering occurring because of unsuccessful transmission.

Historical signal strength may also be used to help predict the future signal strength, such as when a user is moving further away from a tower or an edge of a signal beam. The indications of network quality are indicative of whether or not a frame will be successfully transmitted and received. In one example, the indications may be used to generate a probability of successful receipt of a frame. The probability, or the signal strength may be compared to a threshold value to make the determination.

Various probability thresholds may be used and may be user specified or application specific. A success probability of 99% or more may be used for applications where accurate video presentation is desired, such as in first person shooter games. Video used for walking around as a tourist enjoying the view may be acceptable with probabilities that are much lower, such as 30% or less. Other applications may require probabilities of between 30 and 99%.

Based on the determination, the network monitor 135 may either provide the determination, or provide data from which a determination can be made, to the encoder 115. The encoder 115 will then determine which previous frame to utilize as a reference frame for encoding a next P-frame, without having to generate and send a likely much larger I-frame. The next P-frame will include, or be transmitted with information identifying the reference frame in order to allow encoder 115 to generate the next video frame for display 130 using the correct reference frame. In one example, the reference frame selected is a previously sent frame that was most likely received. The reference frame selected may be the frame immediately previous to the frame that was likely not received. If several frames in a row were likely not received, the reference frame may be several frames prior to the current frame to be encoded.

In one example, the connection quality information may be temporally associated with each frame. This may result in a determination that two previously transmitted frames were likely not received. In this case, the next P-frame will be encoded using a frame that was transmitted just prior to the two frames that were likely not received. If too many frames were likely not received, such as three or more, the next frame may be encoded as an I-frame to ensure video viewing quality is not significantly adversely affected. An I-frame may be better to send if there are significant changes in the view, such as may occur in video capture from a fast panning camera or a drastic scene change or event.

In further embodiments, the determination may be indicative of a future network quality and be used to preclude encoding of a next video frame, as it is likely such a next video frame will not be received. The determination may be used to determine when to send a next P-frame, which will then be encoded based on a previously likely received frame.

Figure 2:
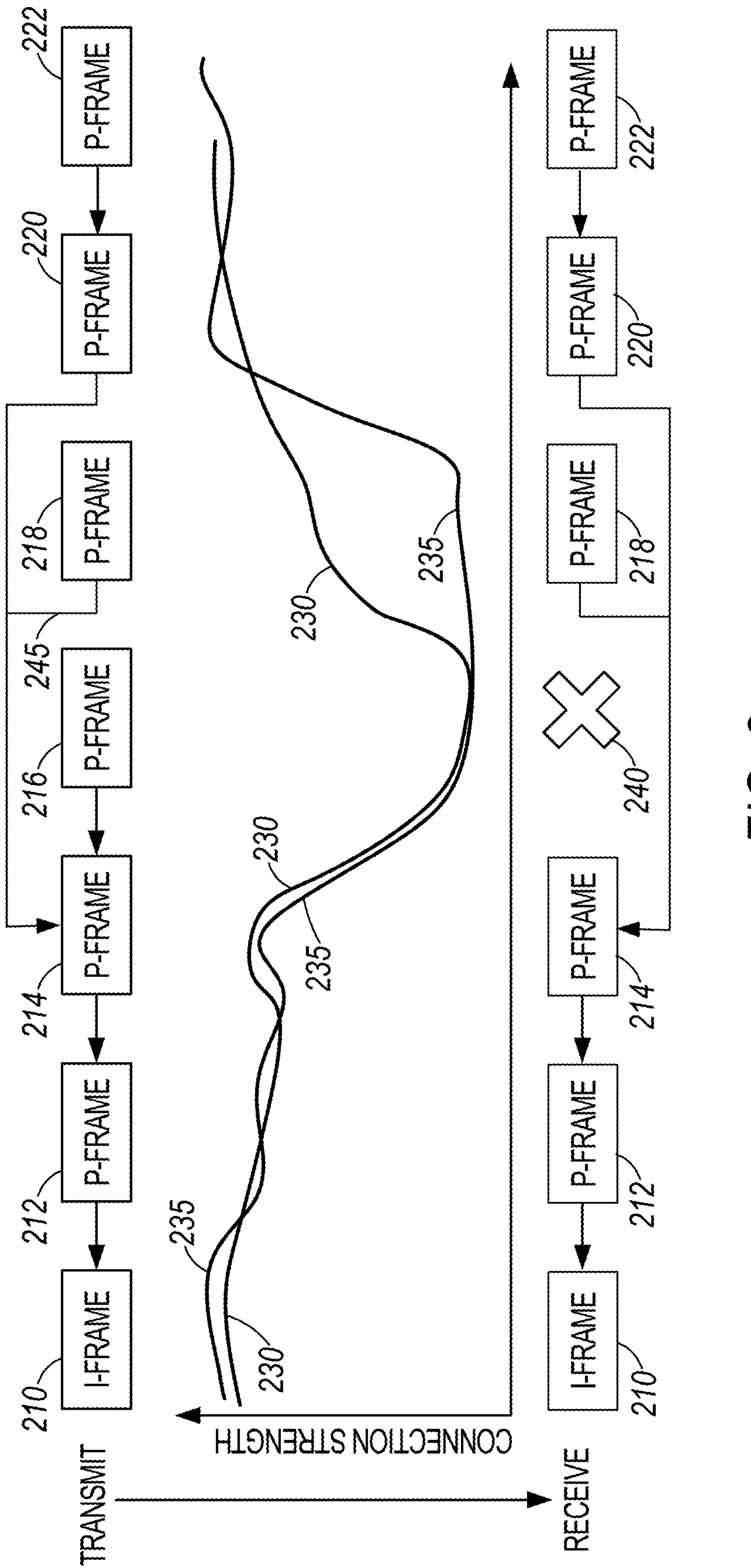
FIG. 2 is a graph illustrating a sequence of video frames over time in conjunction with a representation of connection strength or quality according to an example embodiment.

FIG. 2 is a graph 200 illustrating a sequence of video frames over time in conjunction with a representation of connection strength or quality. Video frames to be transmitted are represented at the top of the graph 200 by frames 210, 212, 214, 216, 218, 220, and 222. Frame 210 is an I-frame, and frames 212, 214, 216, 218, 220, and 222 are P-frames. Received frames are shown at the bottom of the graph 200 using the same reference numbers. A connection strength is shown by two lines 230 and 235 representing actual connection or signal strength and predicted connection or signal strength respectively. Both connection strength lines track each other fairly closely, and the corresponding reference numbers are shown several times to make up for the lack of color in the lines 230 and 235.

The received frames include frames 210, 212, and 214 while the connection strength appears higher. The connection strengths drop just after frame 214, meaning that the probability that frame 216 was successfully transmitted and received is low, as indicated by an "X" at 240. Shortly after, actual connection strength line 230 rises, meaning that frame 218 transmitted at that time will likely be received. Since it is known that frame 216 was likely not received, frame 218 is a P-frame that encodes the differences using frame 214 as a reference frame as indicated at line 245 and transmits frame 214.

In one example, frame 214 is shown as having been received. However, the predicted connection strength on line 235 is still low at the time frame 218 was transmitted and received. The encoding system may utilize the predicted connection strength, and not count on the fact that frame 218 was received. The encoding system will then encode from 220 based on frame 214, which was transmitted with a high probability of being received based on both of the actual and predicted connection strength lines 230 and 235. Note that at the time frame 220 is transmitted, both predicted connection strength lines 230 and 235 are in the higher range. Finally, frame 222 is encoded when both actual and predicted connection strengths are high, so it is encoded based on the previous frame 220, which was encoded and transmitted when both connection strengths were also in the higher range.

Figure 3:
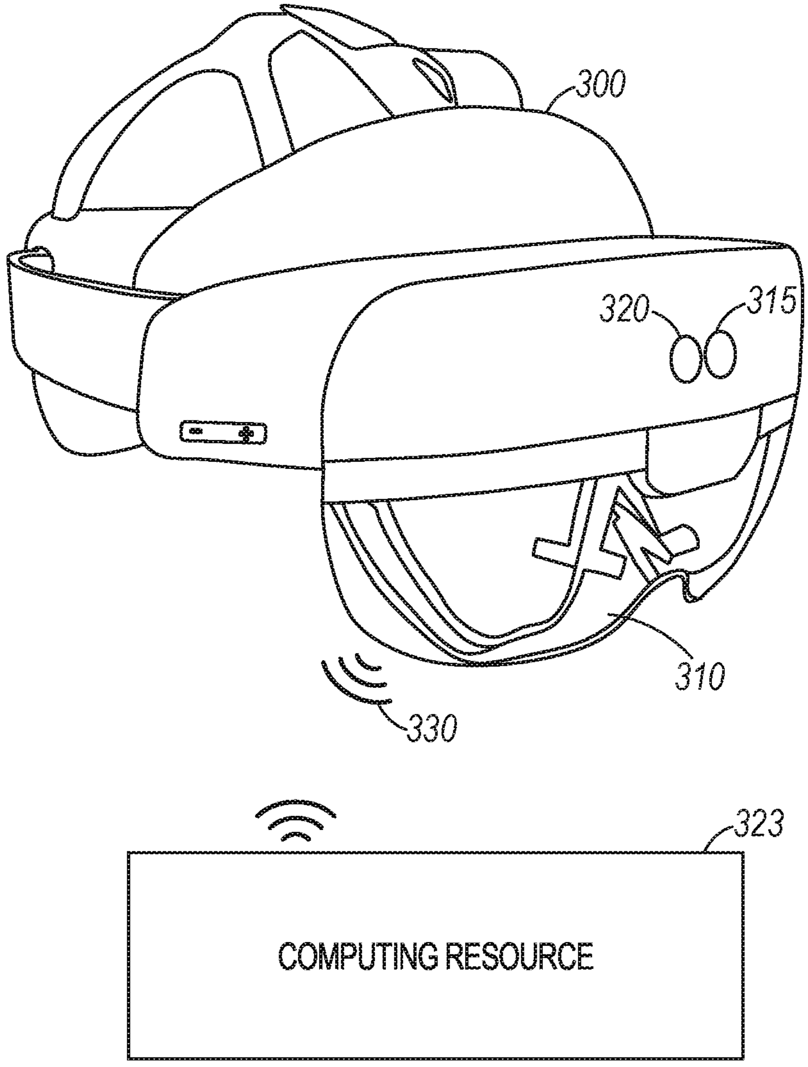
FIG. 3 is a block diagram illustrating two devices generally at for transferring rendered video frames between each other according to an example embodiment.

FIG. 3 is a block diagram illustrating two devices generally at 300 for transferring rendered video frames between each other. A mixed reality headset 305 is a head mounted device to be worn on the head of a user and includes a display 310 and one or more cameras 315 and 320. The display 310 may be divided into two separate displays, one for each eye of the user. The display may be used to display video received from a network connected computing resource 323, such as cloud-based computing resources. Both headset 305 and computing resource 323 may be connected via a wireless network and wirelessly transmit and receive information including video frames as indicated at 325 and 330. Both headset 305 and computing resource 323 may also include both encoders and decoders to dynamically encode frames based on network quality. In further embodiments, two devices transferring video may be other gaming devices or cellular phones, tablets or other devices.

Figures 4, 5:
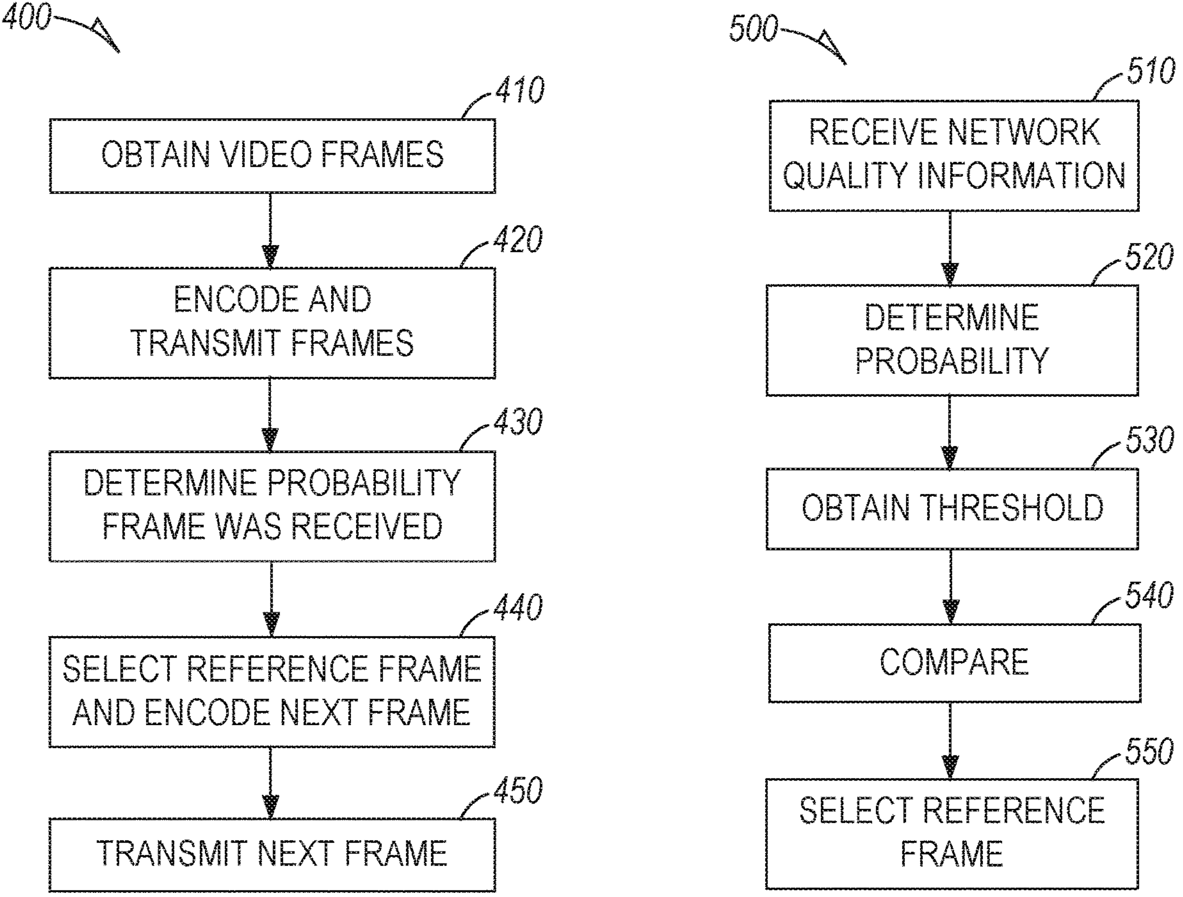
FIG. 4 is a flowchart illustrating a computer implemented method of dynamically selecting reference frames for encoding P-frames based on network connection quality according to an example embodiment.
FIG. 5 is a flowchart illustrating a computer implemented method of determining a probability that the last transmitted video frame was received according to an example embodiment.

FIG. 4 is a flowchart illustrating a computer implemented method 400 of dynamically selecting reference frames for encoding P-frames based on network connection quality. In one example, frames may be sent as received from a video source, such that frames are received and displayed on a receiving device with as little delay as possible. Method 400 begins at operation 410 by obtaining video frames to transmit. Multiple of the frames are encoded and transmitted via a network connection to a recipient at operation 420. Operation 430 determines a probability that a last video frame will be or was received. A next frame is encoded as a P-frame that identifies changes from a selected previously transmitted frame at operation at operation 440. The selected previously transmitted frame is used as a reference frame and is selected as a function of the probability that the last transmitted video frame will be or was received. At operation 450, the next encoded frame is transmitted.

FIG. 5 is a flowchart illustrating a computer implemented method 500 of determining a probability that the last transmitted video frame was received at operation of 430 of method 400. Method 500 begins at operation 510 by receiving network quality information. The received network quality information comprises cellular network signal strength received from a cellular network, receipt of an acknowledgement within a selected time, a network congestion signal, network packet error rates, or buffering occurring because of unsuccessful transmission. The network quality information may also be indicative of future network quality. The probability is determined beginning at operation 520 based on the received network quality information.

In one example, the probability may be selected from a table that may be empirically derived based on data from various measures of network quality correlated with information corresponding to actual received frames. For example, a cellular network signal strength may be the network quality information. High signal strengths are correlated to high probability of receipt, while lower signal strengths correspond to lower probabilities of receipt.

A machine learning model may also be trained to classify frames as successfully transmitted or received. Training data for such a model may be based on one or more of such measures of network quality and corresponding empirical data of frames having been received or not.

At operation 530, a probability threshold is obtained and compared at operation 540 to the determined probability. Operation 550 selects the frame transmitted prior to the last transmitted frame in response to the probability threshold being greater than the generated probability.

The probability threshold is user settable and may also be application specific. In one example, the probability threshold is at least 99 percent, or may be less in further examples. The previously transmitted frame may be the frame immediately preceding the last transmitted frame that was likely not received, or may be is more than one frame before the last transmitted frame in the event that network quality was low for more than one transmitted frame.

In one example, it may be known prior to transmission of a frame that the frame will likely not be received. The frame need not be transmitted in such a case to help reduce bandwidth utilization. In the event that network quality is low for several frames, the differences between the last likely successfully transmitted and received frame and a next frame may be significant, which would result in a very large P-frame. In such cases, a new I-frame may be encoded and transmitted. The decision to encode a P-frame or an I-frame may be made based size, processing time, or video quality consideration, or a combination of such considerations in further examples.

Figure 6:
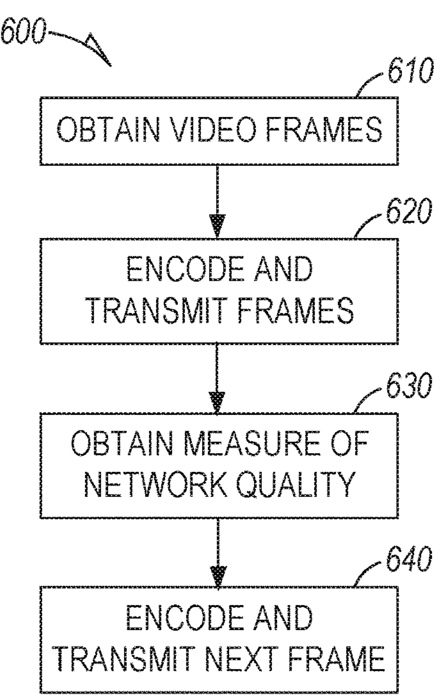
FIG. 6 is a flowchart of an alternative computer implemented method of dynamically selecting reference frames for encoding P-frames based on network connection quality according to an example embodiment.

FIG. 6 is a flowchart of an alternative computer implemented method 600 of dynamically selecting reference frames for encoding P-frames based on network connection quality. Method 600 begins at operation 610 by obtaining video frames to transmit. Multiple of such video frames are encoded and transmitted via a network connection to a recipient at operation 620. A measure of quality of the network connection is obtained at operation 630. Operation 640 encodes and transmits a next frame as a P-frame that identifies changes from a previously transmitted frame selected as a function of the measure of quality of the network connection.

The measure of quality of the network is representative of the probability of a transmitted video frame having been successfully received. In one example, the probability of the transmitted video frame having been received is based on the received network quality information.

The previously transmitted frame may be selected as a frame transmitted prior to the last transmitted frame in response to an obtained probability threshold. The obtained probability is compared to the probability threshold and the previously transmitted frame is selected in response to the probability threshold being greater than the generated probability.

Figure 7:
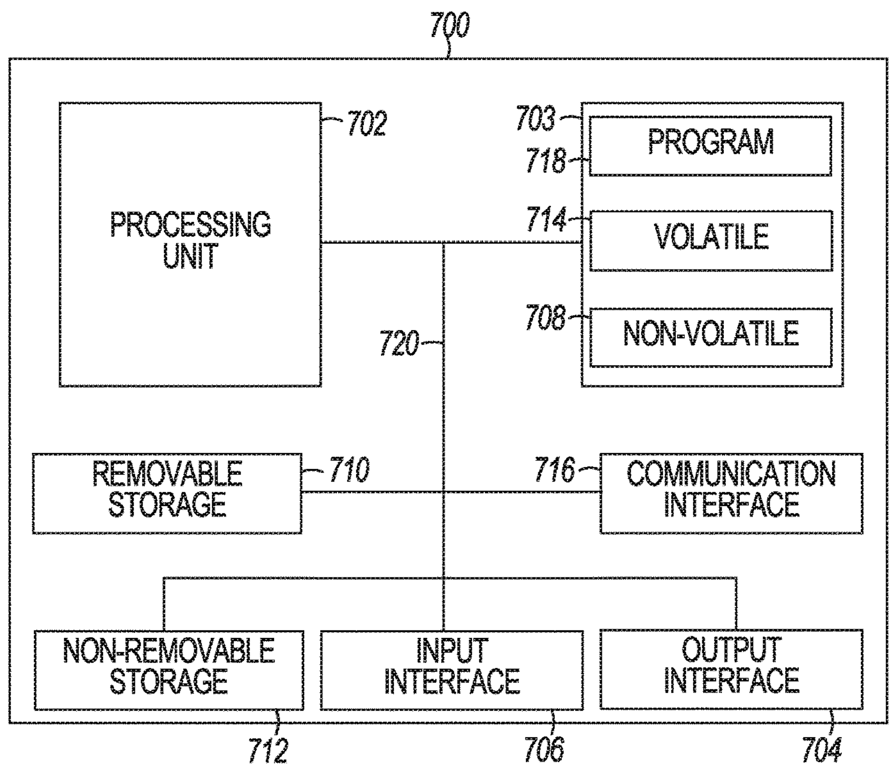
FIG. 7 is a block schematic diagram of a computer system to implement one or more example embodiments.

FIG. 7 is a block schematic diagram of a computer system 700 used to encode and decode video frames and select reference frames based on network quality information for encoding P-frames. Computer system 700 may also be used for performing methods and algorithms according to example embodiments. All components need not be used in various embodiments.

One example computing device in the form of a computer 700 may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, smart storage device (SSD), or other computing device including the same or similar elements as illustrated and described with regard to FIG. 7. Devices, such as smartphones, tablets, and smartwatches, are generally collectively referred to as mobile devices or user equipment.

Although the various data storage elements are illustrated as part of the computer 700, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 706, output interface 704, and a communication interface 716. Output interface 704 may include a display device, such as a touchscreen, that also may serve as an input device. The input interface 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 718. The program 718 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 718 along with the workspace manager 722 may be used to cause processing unit 702 to perform one or more methods or algorithms described herein.

Examples

1. A computer implemented method includes obtaining video frames to transmit. The video frames are encoded and transmitted via a network connection. A probability that a last video frame will be or was received is determined. A next frame is encoded and transmitted as a P-frame that identifies changes from a previously transmitted frame. The previously transmitted frame is selected as a function of the probability that the last transmitted video frame will be or was received.

2. The method of example 1 wherein determining the probability that the last transmitted video frame was received includes receiving network quality information and generating the probability based on the received network quality information.

3. The method of example 2 wherein the previously transmitted frame is selected as a frame transmitted prior to the last transmitted frame in response to obtaining a probability threshold, comparing the generated probability to the probability threshold, and selecting the frame transmitted prior to the last transmitted frame in response to the probability threshold being greater than the generated probability.

4. The method of example 3 wherein the probability threshold is user settable.

5. The method of example 4 wherein the probability threshold is application specific.

6. The method of any of examples 3-5 wherein the probability threshold is at least 99 percent.

7. The method of any of examples 2-6 wherein the received network quality information comprises cellular network signal strength received from a cellular network, receipt of an acknowledgement within a selected time, a network congestion signal, network packet error rates, or buffering occurring because of unsuccessful transmission.

8. The method of any of examples 2-7 wherein the network quality information is indicative of future network quality.

9. The method of any of examples 1-8 wherein the previously transmitted frame is more than one frame before the last transmitted frame.

10. A computer implemented method includes obtaining video frames to transmit, encoding and transmitting multiple frames via a network connection, obtaining a measure of quality of the network connection, and encoding and transmitting a next frame as a P-frame that identifies changes from a previously transmitted frame selected as a function of the measure of quality of the network connection.

11. The method of example 10 wherein the measure of quality of the network is representative of a probability of a transmitted video frame having been successfully received.

12. The method of any of examples 10-11 and further comprising generating a probability of the transmitted video frame having been received based on the received network quality information.

13. The method of example 12 wherein the previously transmitted frame is selected as a frame transmitted prior to the last transmitted frame in response to obtaining a probability threshold, comparing the generated probability to the probability threshold, and selecting the frame transmitted prior to a last transmitted frame in response to the probability threshold being greater than the generated probability.

14. The method of any of examples 10-13 wherein the received network quality information comprises cellular network signal strength received from a cellular network, receipt of an acknowledgement within a selected time, a network congestion signal, network packet error rates, or buffering occurring because of unsuccessful transmission.

15. A machine-readable storage device has instructions for execution by a processor of a machine to cause the processor to perform operations to perform any of the methods of examples 1-14.

16. A device includes a processor and a memory device coupled to the processor and having a program stored thereon for execution by the processor to perform operations to perform any of the methods of examples 1-14.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase “configured to” can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
obtaining video frames to transmit;
encoding and transmitting multiple frames via a network connection;
determining a probability that a last video frame will be or was received, wherein the determining the probability includes:
receiving network quality information; and
generating the probability based on the received network quality information; and
encoding and transmitting a next frame as a P-frame that identifies changes from a previously transmitted frame selected as a function of the generated probability, including selecting, for use as a reference frame, between using the last video frame and a frame transmitted prior to the last video frame, wherein the previously transmitted frame is selected, for use as the reference frame, in response to:
obtaining a probability threshold;
comparing the generated probability to the probability threshold; and
selecting the frame transmitted prior to the last video frame in response to the probability threshold being greater than the generated probability.

2. The method of claim 1 wherein the probability threshold is user settable.

3. The method of claim 2 wherein the probability threshold is application specific.

4. The method of claim 1 wherein the probability threshold is at least 99 percent.

5. The method of claim 1 wherein the received network quality information comprises cellular network signal strength received from a cellular network, receipt of an acknowledgement within a selected time, a network congestion signal, network packet error rates, or buffering occurring because of unsuccessful transmission.

6. The method of claim 1 wherein the network quality information is indicative of future network quality.

7. The method of claim 1 wherein the frame transmitted before the last video frame is more than one frame before the last video frame.

8. The method of claim 1 wherein the determining the probability is performed without counting on whether the last video frame was received.

9. The method of claim 1 further comprising:
determining a probability that a given video frame will be or was received; and
encoding and transmitting a subsequent frame as a P-frame that identifies changes from the given video frame, the given video frame being selected as a reference frame for the subsequent frame in response to the probability threshold being less than the probability that the given video frame will be or was received.

10. A computer system comprising one or more processing units and memory, wherein the computer system implements a video encoder configured to perform operations comprising:
obtaining video frames to transmit;
encoding and transmitting multiple frames via a network connection;
determining a probability that a last video frame will be or was received, wherein the determining the probability includes:
obtaining a measure of quality of the network connection; and
generating the probability based on the obtained measure; and
encoding and transmitting a next frame as a P-frame that identifies changes from a previously transmitted frame selected as a function of the generated probability, including selecting, for use as a reference frame, between using the last video frame and a frame transmitted prior to the last video frame, wherein the previously transmitted frame is selected, for use as the reference frame, in response to:
obtaining a probability threshold;
comparing the generated probability to the probability threshold; and
selecting the frame transmitted prior to the last video frame in response to the probability threshold being greater than the generated probability.

11. The computer system of claim 10 wherein the measure of quality of the network connection comprises cellular network signal strength received from a cellular network, receipt of an acknowledgement within a selected time, a network congestion signal, network packet error rates, or buffering occurring because of unsuccessful transmission.

12. The computer system of claim 10 wherein the determining the probability is performed without counting on whether the last video frame was received.

13. The computer system of claim 10 wherein the operations further comprise:

determining a probability that a given video frame will be or was received; and encoding and transmitting a subsequent frame as a P-frame that identifies changes from the given video frame, the given video frame being selected as a reference frame for the subsequent frame in response to the probability threshold being less than the probability that the given video frame will be or was received.

14. The computer system of claim 10 wherein the probability threshold is user settable and is application specific.

15. A machine-readable storage device having instructions for execution by a processor of a machine to cause the processor to perform operations to perform a method, the operations comprising:

obtaining video frames to transmit;

encoding and transmitting multiple frames via a network connection;

determining a probability that a last video frame will be or was received, wherein the determining the probability includes:

receiving network quality information; and generating the probability based on the received network quality information; and encoding and transmitting a next frame as a P-frame that identifies changes from a previously transmitted frame selected as a function of the generated probability, including selecting, for use as a reference frame, between using the last video frame and a frame transmitted prior to the last video frame, wherein the previously transmitted frame is selected, for use as the reference frame, in response to:

obtaining a probability threshold;

comparing the generated probability to the probability threshold; and selecting the frame transmitted prior to the last video frame in response to the probability threshold being greater than the generated probability.

16. The device of claim 15 wherein the probability threshold is user settable and is application specific.

17. The device of claim 15 wherein the received network quality information comprises cellular network signal strength received from a cellular network, receipt of an acknowledgement within a selected time, a network congestion signal, network packet error rates, or buffering occurring because of unsuccessful transmission.

18. The device of claim 15 wherein the frame transmitted before the last video frame is more than one frame before the last video frame.

19. The device of claim 15 wherein the determining the probability is performed without counting on whether the last video frame was received.

20. The device of claim 15 wherein the operations further comprise:

determining a probability that a given previous frame will be or was received; and encoding and transmitting a subsequent frame as a P-frame that identifies changes from the given previous frame, the given previous frame being selected as a reference frame for the subsequent frame in response to the probability threshold being less than the probability that the given previous frame will be or was received.

* * * * *